US008081498B2

(12) United States Patent
Mayuzumi et al.

(10) Patent No.: US 8,081,498 B2
(45) Date of Patent: Dec. 20, 2011

(54) INTERNAL COMBUSTION ENGINE CONTROLLER

(75) Inventors: Takuya Mayuzumi, Hitachinaka (JP); Mitsuhiko Watanabe, Odawara (JP); Ryoichi Oura, Hitachinaka (JP); Masahiro Sasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 12/372,355

(22) Filed: Feb. 17, 2009

(65) Prior Publication Data

US 2009/0243574 A1 Oct. 1, 2009

(30) Foreign Application Priority Data

Mar. 28, 2008 (JP) ................................ 2008-087334

(51) Int. Cl.
*H02M 3/18* (2006.01)
*G05F 1/10* (2006.01)
*F02M 41/00* (2006.01)

(52) U.S. Cl. .......................... 363/59; 323/222; 123/490

(58) Field of Classification Search .................... 363/59, 363/60; 323/222, 282, 285, 288; 123/472, 123/478, 490
See application file for complete search history.

(56) References Cited

U.S. PATENT DOCUMENTS

| | | | | |
|---|---|---|---|---|
| 5,844,786 | A | 12/1998 | Yoshida et al. | |
| 6,963,498 | B2 * | 11/2005 | Nadd | 363/26 |
| 7,497,206 | B2 * | 3/2009 | Kemmer | 123/490 |
| 2005/0168206 | A1 | 8/2005 | Nadd | |

FOREIGN PATENT DOCUMENTS

| | | | |
|---|---|---|---|
| DE | 199 12 966 | A1 | 10/2000 |
| DE | 10 2004 054 109 | A1 | 7/2005 |
| JP | 9-285108 | A | 10/1997 |
| JP | 2001-055948 | A | 2/2001 |
| JP | 2004-346808 | A | 12/2004 |
| JP | 2006-336568 | A | 12/2006 |
| JP | 2008-115848 | A | 5/2008 |

OTHER PUBLICATIONS

European Search Report dated Oct. 19, 2010 (six (6) pages).

* cited by examiner

*Primary Examiner* — Matthew Nguyen
(74) *Attorney, Agent, or Firm* — Crowell & Moring LLP

(57) ABSTRACT

An internal combustion engine controller comprises a booster coil connected to a battery and a booster capacitor. A switch element is connected to the booster coil to control the passage of current through the booster coil and an interruption of the current. The booster capacitor accumulates electrical energy generated with an inductance of the booster coil at the time of the interruption of the passage of the current. A booster control circuit carries out control in a constant boost switching cycle so as to pass the current through the booster coil and the switch element until the current reaches a preset switching stop threshold value and then interrupt the current to charge the energy generated with the inductance of the booster coil into the booster capacitor. The booster control circuit is configured to ensure a minimum time period for the booster capacitor-charging of the energy within the boost switching cycle.

6 Claims, 8 Drawing Sheets

INTERNAL COMBUSTION ENGINE CONTROLLER

CLAIM OF PRIORITY

The present application claims priority from Japanese patent application serial no. 2008-87334, filed on Mar. 28, 2008, the content of which is hereby incorporated by reference into this application.

FIELD OF THE INVENTION

The present invention relates to an internal combustion engine controller that use a high voltage obtained by boosting battery voltage to drive a load, for example, an fuel injector used for a cylinder direct injection system of an internal combustion engine. The present invention is applicable for various internal combustion engines of automobiles, motorcycles, agricultural equipment, machine tools, marine equipment, and the like powered with gasoline, light oil, or the like.

BACKGROUND OF THE INVENTION

In the internal combustion engines used for automobiles, motorcycles, agricultural equipment, machine tools, marine equipment, and the like powered with gasoline, light oil, or the like, in order to improve fuel economy or output, injectors that directly inject fuel into cylinders have been conventionally used. These injectors are designated as “cylinder injection direct injector” or “direct injector (DI).”

An engine using a cylinder injection direct injector is required to use fuel pressurized to high pressure unlike a conventional indirect injector in which a fuel is injected into an intake passage or an intake port to form air-fuel mixture. In the engine, therefore, high energy (voltage) is required for valve opening operation of the injector. To enhance controllability of the direct injector and achieve high-speed driving, it is required to supply the injector with high energy in a short time.

Many of conventional internal combustion engine controllers for controlling the direct injectors of internal combustion engines have boost circuits for boosting the voltage of battery as power supply to boost electric power supplied to the injectors.

FIG. 8 is a circuit diagram illustrating a conventional internal combustion engine controller. As illustrated in FIG. 8, the internal combustion engine controller includes a boost circuit 100 that is placed between a drive circuit 2 for driving a direct injector (DI) 3 and a battery 1 as power supply. The boost circuit boosts battery-power supply voltage to a higher voltage in a short time and supplies this boost voltage $V_{100}$ to the drive circuit 2. The boost circuit 100 includes: a booster coil 110 that boosts the voltage (power supply voltage) of the battery; a switch element 120 that turns on/off power application to the booster coil 110; and a booster capacitor 130 that is inserted in parallel with the switch element 120 through a charging diode 140 for backflow prevention and stores energy from the booster coil 110. The switch element 120 is connected with a booster control circuit 150 that controls turn-on/off of the switch element 120. The booster control circuit 150 includes: a boost control part 151 that controls driving of the switch element 120; a voltage sensor part 152 that senses a charging voltage of the booster capacitor 130; and a current sensor part 153 that senses a current passed through the switch element 120. As the result of control by the boost control part 151, when the switch element 120 is turned on, a current from the battery 1 flows to the booster coil 110 through the switch element 120 and electrical energy is stored in the booster coil 110 by the inductance of the coil. When the switch element 120 is turned off, the current having passed through the booster coil 110 is interrupted and the booster capacitor 130 is charged with electrical energy of the booster coil 110.

FIG. 3(*e*) is an example of a current waveform of injector energization current 3A passed through the direct injector 3. As indicated by FIG. 3(*e*), in an initial stage of the passage of current through the injector 3, the injector energization current 3A is increased up to a predetermined upper limit peak current 460 in a short time by boost voltage 100A (peak current passing period 463). This peak current value is to open a valve of the injector 3 and larger by 5 to 20 times or so than the peak current value of injector energization current passed through conventional indirect type injectors.

After the end of the peak current passing period 463, the electric power supplied to the injector 3 is changed from boost voltage 100A to a voltage of the battery 1, and the current supplied to the injector 3 is controlled to a first hold current 461-1 to 461-2 as a current that is ½ to ⅓ or so of the peak current (a hold current is to hold a valve opening of the injector). Thereafter, the current is controlled to a second hold current 462 as a current that is ⅔ to ½ of the first hold current. During periods of the passage of the peak current 460, the first and second hold currents, the injector 3 is opened and injects fuel into the cylinder.

The process of changing from the upper limit peak current 460 to the first hold current is determined by the following elements: the magnetic circuit characteristic and fuel spray characteristic of the injector 3; the injector energization current passing period corresponding to a fuel supply quantity determined by the fuel pressure of a common rail for supplying fuel to the injector 3 and power requested of the internal combustion engine; and the like. The process includes those in the following cases: cases where the current is stepped down in a short time; cases where the current is gently stepped down; cases where the current is gently stepped down during a peak current gentle step-down period 464-1 and is stepped down in a short time during a peak current steep step-down period 464-2 as indicated by FIG. 3(*e*); and the like.

In order to quickly close the injector 3 after the end of fuel injection, the internal combustion engine controller is required to shorten the passage of current for a step-down period 466 of the injector energization current 3A (namely, a period for which the injector energization current 3A is stepped down from the second hold current 462 to a ground level) to interrupt the injector energization current 3A. Further, it is also required to step-down the injector energization current 3A in short time in the process 464-2 of stepping down the current from the peak current 460 to the first hold current 461-1, and in the process 465 of stepping down the current from the first hold current 461-2 to the second hold current 462.

However, since the injector energization current 3A is being passed through the driving coil of the injector 3 and high energy arising from the inductance of the coil is stored, in order to step down the injector energization current 3 in short time, it is required to eliminate such stored energy from the injector 3. There are some methods to achieve the elimination of the stored energy of the injector driving coil in the short step-down period 466. Such methods include: a method of utilizing the Zener diode effect in a drive element of the drive circuit 2 forming the injector energization current 3A to convert supplied energy into thermal energy; a method of regenerating the energy to the booster capacitor 130 for the driving energy of the injector driving coil through a current regenerating diode 5 placed between the drive circuit 2 and the boost circuit 100; and the like.

The above method of converting the energy into thermal energy makes it possible to simplify the drive circuit 2. However, converting the energy of an injector 3 into thermal energy is unsuitable for drive circuits involving the passage of large current.

Meanwhile, the above method of regenerating the energy to the booster capacitor 130 makes it possible to relatively suppress heating from the drive circuit 2 even when a large current is passed through an injector 3. Therefore, the method is widely used, especially, in engines in which a large current is passed through an injector 3. Such engines include engines using a direct injector that uses light oil (these engines are also designated as "common rail engines" sometimes); engines using a direct injector powered with gasoline; and the like.

An example of the controllers using a boost circuit that regenerates the stored energy of an injector driving coil to a booster capacitor is disclosed in Patent Document JP-A-2001-55948. Description will be given to the operation of this boost circuit with reference to FIG. 8 and FIG. 3.

The drive circuit 2 uses the boost voltage 100A of the boost circuit 100 to pass the injector energization current 3A through the injector 3. As a result, it is detected by the voltage sensor part 152 that the boost voltage 100A has dropped to a voltage 401 as a reference for starting a boost operation or below, as indicated by FIG. 3(*a*), the boost control part 151 starts the boost operation (incidentally, in FIG. 3(*a*), a reference numeral 400 denotes 0 [V]). The boost control part 151 changes a boost control signal 151B for the passage of current through the switch element 120 from LOW to HIGH. As a result, the switch element 120 is turned on, and a current flows from the battery 1 to the booster coil 110 and energy is stored in the booster coil 110. The booster coil current 110A passing through the booster coil 110 is converted into a voltage by a current sensing resistor 160 as the voltage for indicating a current passing through the switching element 120 (hereafter, referred to as "switching current for boosting") 160A. It is then detected by the current sensor part 153. When the waveform of the switching current 160A for boosting detected at the current sensor part 153 is as indicated by FIG. 3(*b*). When the switching current 160A for boosting exceeds a preset switching stop threshold value 410 as indicated by FIG. 3(*b*), the boost control part 151 changes the boost control signal 151B for controlling the switch element 120 from HIGH to LOW to interrupt the switching current 160A. As the result of this interruption, the current having passed through the booster coil 110 cannot flow to ground 4 through the switch element 120 anymore. The energy stored by the inductance of the booster coil 110 generates high-voltage. When the voltage of the booster coil 110 becomes higher than the voltage obtained by the boost voltage 100A accumulated in the booster capacitor 130 and the forward voltage of the charging diode 140, the energy stored in the booster coil 110 migrates as a charging current 140A to the booster capacitor 130 through the charging diode 140. As indicated by FIG. 3(*d*), an initial value of the charging current 140A is a level of the current passing through the booster coil 110 immediately before the switch element 120 is interrupted, namely, the level of the switching stop threshold value 410, and then the charging current 140A decreases rapidly.

When it is detected that the boost voltage 100A boosted by the above operation does not reach the reference voltage 402 of a predetermined boost stop level, the boost control part 151 changes the boost control signal 151B from LOW to HIGH according to a boost switching cycle to pass current through the switch element 120 without detection of charging current 140A. This operation is repeated until the boost voltage reaches the voltage 402 of the predetermined boost stop level (boost voltage recovery time 403).

Meanwhile, when interruption or step-down in a short time of the injector energization current 3A is started by the drive circuit 2, a regenerative current from the injector 3 flows into the booster capacitor 130 through the current regenerating diode 5 during the step-down period 466 of the second hold current, the step-down period 464-2 of the peak current, and the step-down period 465 of the first hold current. Thus, similarly with boost operation by the booster coil 110, the energy stored in the inductance of the injector 3 migrates to the booster capacitor 130 and the boost voltage 100A is boosted.

As mentioned above, the boost circuit 100 detects the switching current 160A for boosting and carries out control so that the switching current 160A does not exceed over the switching stop threshold value 410. The boost circuit 100 can hold down the switching current 160A for boosting as compared with boost circuits that carries out control according to a predetermined time without detecting the switching current 160A for boosting (Refer to Patent Document JP-A-9-285108, and JP-A-2004-346808 for example.) Therefore, the boost circuit 100 makes it possible to minimize heating from the switch element 120, booster coil 110, and charging diode 140.

FIG. 5 illustrates a correlation between a boost voltage recovery time 403 and a battery voltage $V_{bat}$. As illustrated in FIG. 5, the boost voltage recovery time 403 does not vary depending on the battery-power supply voltage $V_{bat}$ within a characteristic guaranteed battery voltage range (normal VB) 519 equal to or higher than a characteristic guaranteed minimum battery power supply voltage 516 and an operable high battery voltage range (high VB) 520 equal to or higher than an operable high battery power supply voltage 517. The reason for this is as follows: when the battery voltage is equal to or higher than the characteristic guaranteed minimum battery power supply voltage 516, the switching current 160A for boosting reaches the switching stop threshold value 410 in the predetermined boost switching cycle; and a period required for charging the energy stored in the booster coil 110 into the booster capacitor 130 is within a period behind the stop of switching in the boost switching cycle. The switching stop threshold value 410 is a value so adjusted that a normal-voltage boost voltage recovery request time 513 can be met at the characteristic guaranteed minimum battery power supply voltage 516. This request time 513 is a minimum required boost voltage recovery time requested of the boost circuit 100 by the drive circuit 2 to open an injector 3 in a predetermined time (at predetermined intervals) when the battery power supply voltage is normal voltage. Therefore, energy charged to the booster capacitor 130 by one time of boost switching operation is constant. Within a range equal to or higher than the characteristic guaranteed minimum battery power supply voltage 516, the boost voltage recovery time 403 is equal to or lower than the normal-voltage boost voltage recovery request time 513.

However, when the battery voltage $V_{bat}$ drops into an operable low battery voltage range (low VB) 518 lower than the characteristic guaranteed minimum battery voltage 516, as illustrated in FIG. 4B, the switching current 160A for boosting does not reach the switching stop threshold value 410 within a predetermined boost switching cycle 500. Therefore, the period required to charge the energy stored the booster coil 110 into the booster capacitor 130 (booster coil charging period 502') is shifted to the next boost switching cycle 500. Consequently, the period from the end of the booster coil charging period to the start of the next switching cycle 500, namely the period during which the booster coil current 110A is not energized (boost operation stop period 503) is lengthened. Therefore, the boost voltage recovery time 403 is lengthened by the influence of the battery voltage $V_{bat}$ drop. As a result, the low-voltage boost voltage recovery request time 512 in FIG. 5 may not be met sometimes. This request time 512 is a minimum required boost voltage recovery time, which is requested to the boost circuit by the drive circuit 2 to open a valve of the injector in a predetermined time (at predetermined intervals) when the battery voltage is equal to or lower than the characteristic guaranteed minimum battery voltage 516.

The present invention is to provide an internal combustion engine controller that makes it possible to minimize the lengthening of the boost voltage recovery time of a boost circuit when battery voltage drops and to meet a low-voltage boost voltage recovery request time to solve the above problem.

SUMMARY OF THE INVENTION

To achieve the above object, the internal combustion engine controller of the invention is provided with: a booster coil connected to a battery to boost a voltage of the battery; a switch element connected to the booster coil to control the passage of current through the booster coil and an interruption of the current; a booster capacitor for accumulating electrical energy generated with an inductance of the booster coil; and a booster control circuit for carrying out control in a constant boost switching cycle so as to pass the current through the booster coil and the switch element until the current reaches a preset switching stop threshold value and then interrupt the current to charge the energy generated with the inductance of the booster coil into the booster capacitor. In this internal combustion engine controller, the booster control circuit is configured to ensure at least minimum time period for the booster capacitor-charging of the energy within the boost switching cycle.

According to the invention, it is possible to minimize the lengthening of the boost voltage recovery time of a boost circuit when battery voltage drops and to meet a low-voltage boost voltage recovery request time.

BRIEF DESCRIPTION OF THE DRAWINGS

FIG. 2(*b*) is a drawing illustrating a voltage waveform of a high-frequency clock signal (155A); FIG. 2(*c*) is a drawing illustrating a voltage waveform of a boosting energization timing signal (156A); FIG. 2(*d*) is a drawing illustrating a voltage waveform of a boost control signal (151A); FIG. 2(*e*) is a drawing illustrating a current waveform of a booster coil current (11A), and FIG. 2(*f*) is a drawing illustrating ranges of a battery voltage corresponding to the boost operation waveforms of FIG (a) to (e);

FIG. 3(*b*) is a drawing illustrating a current waveform of a switching current for boosting (160A); FIG. 3(*c*) is a drawing illustrating a voltage waveform of a boost control signal (151B), FIG. 3(*d*) is a drawing illustrating a current waveform of a charging current (140A), and FIG. 3(*e*) is a drawing illustrating a current waveform of an injector energization current (3A);

DETAILED DESCRIPTION OF THE PREFERRED EMBODIMENTS

Hereinafter, description will be given to preferred embodiments of the invention with reference to the accompanying drawings.

Figure 1:
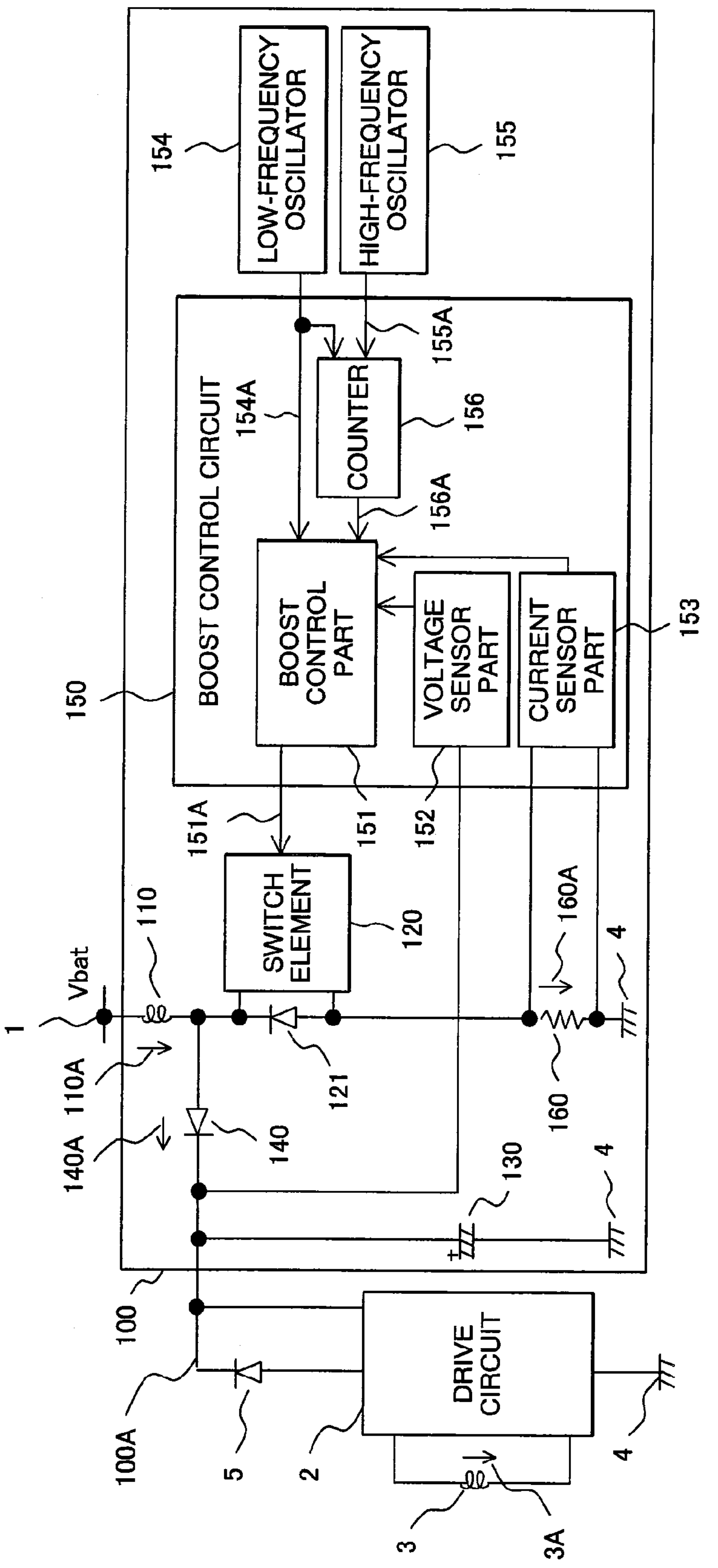
FIG. 1 is a circuit diagram illustrating an internal combustion engine controller in a first embodiment of the invention.

FIG. 1 is a circuit diagram illustrating an internal combustion engine controller in a first embodiment.

As illustrated in FIG. 1, the internal combustion engine controller includes: a boost circuit 100 supplied with power by a battery 1 as a power supply and a ground 4 of the battery 1; and a drive circuit 2 for driving an electromagnetic valve (solenoid) of an injector 3. The boost circuit 100 boosts battery-power supply voltage $V_{bat}$ and supplies the obtained boost voltage 100A to the drive circuit 2. A regenerative current-diode 5 is provided between the boost circuit 100 and the drive circuit 2 to supply the regenerative current from the injector 3 to the boost circuit 100.

The boost circuit 100 includes: a booster coil 110 having an inductance for boosting the voltage of the battery 1; a switch element 120 that switches between the passage of current through the booster coil 110 and an interruption of the current; a booster capacitor 130 for accumulating current energy stored at the inductance of the booster coil 110; a charging diode 140 for prevents reverse current from flowing from the booster capacitor to the booster coil side; and a booster control circuit 150 for controlling turn-on/off of the switch element 120 in accordance with current passing through the booster coil 110 (booster coil current 110A) and boost voltage 100A.

One end of the booster coil 110 is connected to the battery 1 and the other end thereof is connected to the switch element 120. One end (anode) of the charging diode 140 is connected between the booster coil 110 and the switch element 120, and the other end (cathode) of the charging diode 140 is connected to the booster capacitor 130. The booster capacitor 130 functions as a power supply for the drive circuit 2. Further, the capacitor 130 is connected to the drive circuit 2 and the regenerative current-diode 5 so that regenerative current from the drive circuit 2 can be obtained through the regenerative current-diode 5. The other end of the booster capacitor 130 is connected to the ground 4 of the battery 1 and the other end of the switch element 120 is also connected to the ground 4 of the battery 1 through a current sensing resistor 160. The switch element 120 is constructed of a bipolar transistor, such as FET (Field Effect Transistor) or IGBT (Insulated Gate Bipolar Transistor). Between the source and the drain of the switch element 120, there is connected a switch element-side diode 121 for protecting the switch element 120 against a negative surge. The diode 121 is arranged so that a forward direction thereof corresponds to a direction from the current sensing resistor 160 side to the booster coil 110 side.

The booster control circuit 150 includes: a boost control part 151 that controls turn-on/off of the switch element 120; a voltage sensor part 152 for sensing the voltage (boost voltage) 100A of the booster capacitor 130; and a current sensor part 153 for sensing current passing through the switch element 120. The boost control part 151 sends signals to a gate of the switch element 120. The current sensor part 153 receives input of a voltage across the current sensing resistor 160 disposed at the ground side of the switch element 120.

The booster control circuit 150 further includes: a low-frequency oscillator 154 that generates a boosting basic clock signal 154A providing a constant boost switching cycle; a high-frequency oscillator 155 that generates a high-frequency clock signal 155A having a frequency sufficiently higher than that of the boosting basic clock signal 154A; and a counter 156 that generates a boosting energization timing signal 156A based on the basic clock signal 154A and the high-frequency clock signal 155A.

In addition to the boost circuit 100, the internal combustion engine controller includes: various kind of input circuits for an engine speed sensor and various sensors, such as a sensor for a fuel pressure of a common rail for supplying fuel to an injector; a computing unit that computes timing of energization of an injector based on the input signals of these input circuits; an ignition coil drive circuit, a throttle valve drive circuit, and other drive circuits; a circuit for communication with other controllers; control circuits corresponding to various types of diagnoses and fail-safe; a power supply circuit for supplying power to these computing units, drive circuits, and control circuits; and the like. (None of them is Shown in the Drawing.)

Description will be given to operation of the internal combustion engine controller in this embodiment.

Figure 2:
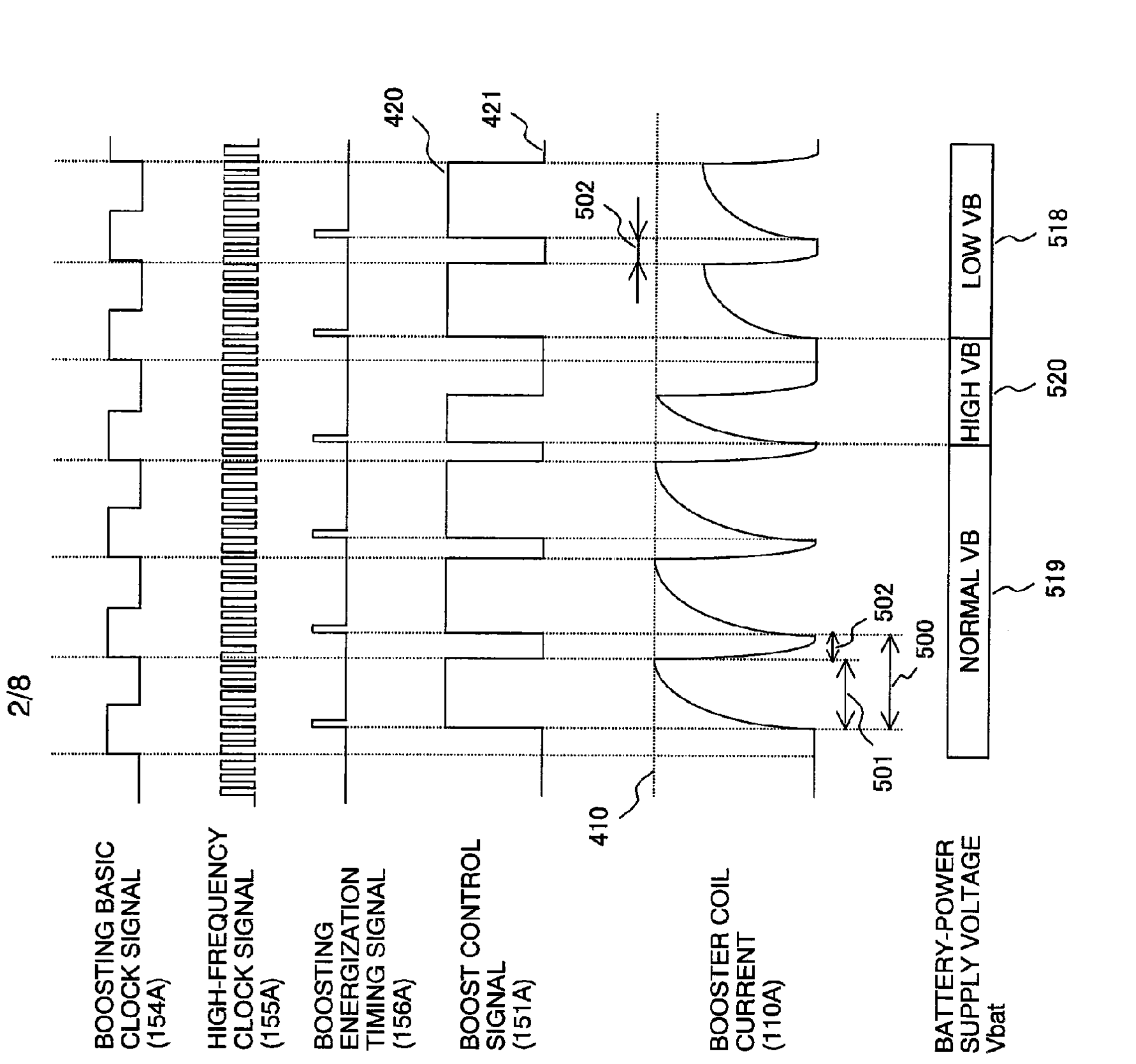
FIG. 2(*a*) is a drawing illustrating a voltage waveform of a boosting basic clock signal (154A)
Figure 3:
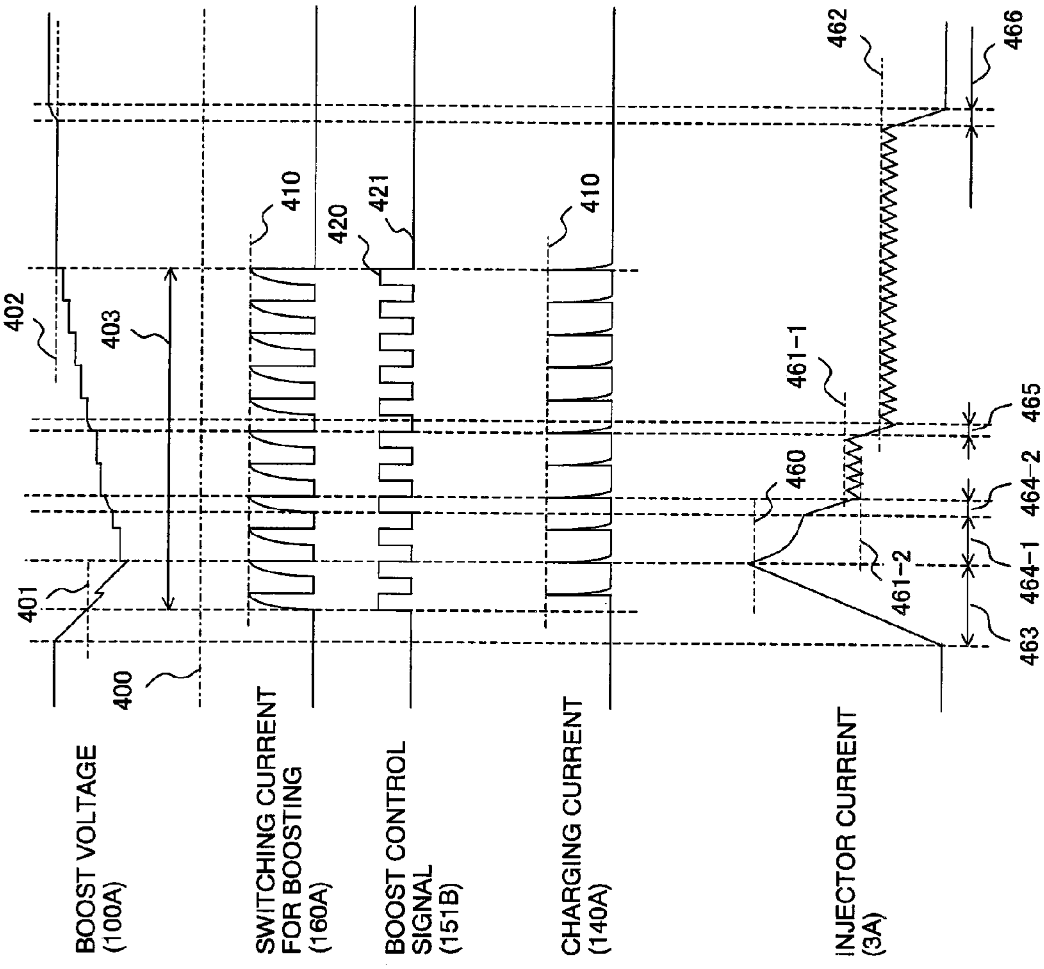
FIG. 3(*a*) is a drawing illustrating a voltage waveform of a boost voltage (100A)

(a) to (e) of FIG. 2 and (a) to (e) of FIG. 3 illustrate voltage waveforms or current waveforms at various points of the internal combustion engine controller. FIG. 2(*a*) illustrates a pulse voltage waveform of the boosting basic clock signal 154A generated at the low-frequency oscillator 154 and outputted to the boost control part 151. FIG. 2(*b*) illustrates a pulse voltage waveform of the high-frequency clock signal 155A generated at the high-frequency oscillator 155 and outputted to the counter 156. FIG. 2(*c*) illustrates a pulse voltage waveform of the boosting energization timing signal 156A generated at the counter 156 and outputted to the boost control part 151. FIG. 2(*d*) illustrates a boost control signal 151A for instructing turn-on/off of the switch element 120, which is outputted from the boost control part 151 to the switch element 120. FIG. 2(*e*) illustrates a current waveform 110A of the booster coil current 110A. FIG. 2(*f*) illustrates that the battery-power supply voltage $V_{bat}$ is within three voltage ranges in correspondence with the voltage waveforms and current waveform in FIG. 2(*a*) to (*e*). The three voltage ranges are of a characteristic guaranteed power supply voltage range 519 of the battery (hereinafter, referred to as "voltage at a normal state (normal VB)"), an operable high power supply voltage range 520 of the battery (hereinafter, referred to as "high VB"), and an operable low power supply voltage range 518 of the battery (hereafter, referred to as "low VB"). With respect to FIG. 2(*f*), in the voltage wavef orms and current wavef orms of FIG. 2(*a*) to (*e*), for example, the normal VB occurs during initial three cycles of the boosting basic clock signal 154A, the high VB occurs during the next one cycle of the boosting basic clock signal 154A, and the low VB occurs during the further next two cycles of the boosting basic clock signal 154A.

FIG. 3(*a*) illustrates a voltage waveform of the boost voltage 100A that is the voltage of the booster capacitor 130. FIG. 3(*b*) illustrates a current waveform of the switching current 160A for boosting (equal to the booster coil current 110A) sensed by the current sensor part 160. FIG. 3(*c*) illustrates a voltage waveform of the boost control signal 151A indicated by FIG. 2(*d*). FIG. 3(*d*) illustrates a current waveform of the charging current 140A passing through the charging diode 140 from the booster coil 110. FIG. 3(*e*) illustrates a current waveform of the injector energization current 3A.

First, description will be given to the operation of the internal combustion engine controller performed when the battery-power supply voltage $V_{bat}$ is within the voltage range of normal VB 519 or high VB 520.

The boost circuit 100 supplies the boost voltage 100A to the drive circuit 2 and the drive circuit 2 allow the injector energization current 3A to pass through the driving coil of the injector 3. As the result of the passage of injector energization current 3A, the boost voltage 100A sensed by the voltage sensor part 152 drops. When this boost voltage drops to a boost start voltage 401 or below, as indicated by FIG. 3(*a*), the boost control part 151 starts boost operation.

The boost operation is started by changing the boost control signal 151A for the passage of current through the switch element 120 from LOW (off) to HIGH (on) with the boost control part 151. When the boost control signal is changed into HIGH and the switch element 120 is turned on, the current (booster coil current 110A) flows from the battery 1 to the booster coil 110. Thereby, the electrical energy (hereafter, its called simply as energy) of an inductance is stored in the booster coil 110. The current passed through the booster coil 110 is converted to a voltage by the current sensing resistor 160 and the converted voltage is sensed by the current sensor part 153 as the switching current 160A.

When the boost control signal 151A is changed to HIGH and the switch element 120 is turned on, the current 110A (switching current 160A for boosting) passed through the booster coil 110 is increased as indicated by FIG. 2(*e*). That is, the booster coil current 110A is increased until it reaches a switching stop threshold value 410 predetermined for prevention of the passage of overcurrent through the switch element 120. When the booster coil current 110A is sensed by the current sensor part 153 that the booster coil current 110A has reached the switching stop threshold value 410, the boost control part 151 changes the boost control signal from LOW to HIGH to turn off the switch element 120. Thereby, the switching current 160A is interrupted. The following time is designated as booster coil current rise time 501: time from start of the passage of current through the booster coil 110 to start of the interruption of the current on condition that the battery voltage $V_{bat}$ is normal VB 519, namely when the booster coil current 110A rises. (Refer to FIG. 2(*e*).)

When the passage of current through the switch element 120 is interrupted, the booster coil current 110A passed through the booster coil 110 cannot flow to ground 4 through the switch element 120 anymore. Then the energy stored by the inductance of the booster coil 110 generates high voltage. When this voltage becomes higher than the total voltage of the voltage (boost voltage 100A) of the booster capacitor 130 and the forward voltage of the charging diode 140, the following takes place: the energy stored in the booster coil 110 migrates as charging current 140A to the booster capacitor 130 through the charging diode 140 and is charged therein.

As indicated by FIG. 3(*d*), immediately after start of the passage of the charging current 140A (immediately after the switch element 120 is interrupted), the charging current 140A is nearly equal to the value of the booster coil current 110A having passed through the booster coil 110 immediately before the switch element 120 is interrupted. After that, the charging current 140A rapidly decreases as the energy from the booster coil 110 migrates to the booster capacitor 130. Consequently, at the booster capacitor 130, the energy from the booster coil 110 is stored, and the boost voltage 100A is increased. On condition that the battery voltage $V_{bat}$ is normal VB, time 502 is one from start of the interruption of the switching current (booster coil current) 160A to re-start of the passage of current 160A through the booster coil 110. The time 502 is set to ensure charging to the booster capacitor 130. Here, therefore, the time 502 will be designated as booster capacitor charge-ensuring time 502 (Refer to FIG. 2(*e*)).

As indicated by FIG. 3(*a*), provided that the boost voltage 100A is lower than a boost stop voltage 402 even when the booster capacitor 130 is charged by the above operation, the boost control part 151 performs the following operation. The boost stop voltage is set as a target voltage for driving an injector 3. The boost control part 151 waits for the preset booster capacitor charge-ensuring time 502 and then changes the boost control signal 151A from LOW to HIGH to pass current through the switch element 120. This on/off operation of the switch element 120 is repeated until the boost voltage 100A reaches the predetermined boost stop voltage 402. The on/off operation is repeated with a certain switching cycle 500 in which the total of the booster coil current rise time 501 and the booster capacitor charge-ensuring time 502 is taken as one cycle.

Description will be given to the switching cycle 500 and the boost control signal 151A that determine the above-mentioned on/off of the switch element 120. As indicated by FIG. 2(*a*) to (*e*), the switching cycle 500 corresponds to the cycle of the boosting control signal 151A. The boost control signal 151A inputted from the boost control part 151 to the gate of the switch element 120 is formed by using the boosting basic clock signal 154A from the low-frequency oscillator 154 and the boosting energization timing signal 156A from the counter 156. In the boosting control signal 151A of FIG. 2(*d*), a reference numeral 420 denotes HIGH level signal and 421 denotes LOW. The boosting energization timing signal 156A is generated based on the high-frequency clock signal 155A outputted from the high-frequency oscillator 155. In this embodiment, the frequency of the basic clock signal is set to several kHz to several hundreds of kHz, more specifically, for example, 20 kHz or so. The frequency of the high-frequency clock signal is set to several MHz, more specifically, for example, 4 MHz or so.

In the internal combustion engine controller of this embodiment, the boost switching cycle is composed of at least the booster coil current rise time 501 and the booster capacitor charge-ensuring time 502 being set independently of the booster coil current rise time 501 (namely the passage time of current through the booster coil). The booster capacitor charge-ensuring time 502 is to ensure at least minimum time period for the booster capacitor-charging of the energy within the boost switching cycle. For example, it is a fixed time period for the charge of the energy generated by the inductance of the booster coil 110 to the booster capacitor within the boost switching cycle, and the time period is set with reference to the above-mentioned time 502 on condition that the battery voltage $V_{bat}$ is normal VB. Start timing of the booster coil current rise time 501 and terminal timing of the booster capacitor charge-ensuring time 502 are set by different signals respectively. That is, as illustrated by FIG. (a)-(e), the start timing of the booster coil current rise time 501 is set at a leading edge of the boosting energization timing signal 156A. On the other hand, the start timing of the booster capacitor charge-ensuring time 502 (fixed time period as a minimum time period within the boost switching cycle) is set at a leading edge of the boosting basic clock signal 154A and the terminal timing of the booster capacitor charge-ensuring time 502 is set at a leading edge of the boosting energization timing signal 156A. Therefore, the booster coil current rise time 501 and the booster capacitor charge-ensuring time 502 are set differently from each other (The booster capacitor charge-ensuring time is set shorter.).

In this embodiment, on condition that the battery voltage $V_{bat}$ is normal VB 519, the booster coil current rise time 501 is defined as the time from when the booster coil current 110A starts to rise to when it reaches the switching stop threshold value 410. The booster capacitor charge-ensuring time 502 is set so as to correspond to the time for which the booster capacitor 130 is charged with the energy generated by the booster coil 110 on condition that the battery power supply voltage $V_{bat}$ is normal VB 519 (that is, on condition of the normal VB 519, it corresponds to the time involved in process that the charging current 140A from the booster coil 110 reduces from the switching stop threshold value 410 to zero.)

As illustrated by FIG. 2(*e*), the booster coil current 110A of the booster coil current rise time 501 at the time of high VB 520 reaches the switching stop threshold value 410 earlier than that of the booster coil current rise time 501 at the time of normal VB 519. That is, the charge of the booster capacitor 130 at high VB 520 is completed earlier than that at normal VB 519. In this case at high VB 520, since the charge has early completed until reaching the preset booster capacitor charge-ensuring time (fixed time period) 502, there are neither rising of the booster coil current nor charging of the booster capacitor 130 during the preset booster capacitor charge-ensuring time 502.

By the way, In the cases when the internal combustion engine is started by supplying a large current to a starter, when power generation of an alternator become insufficient, or when the internal combustion engine is restarted after being temporarily stopped by idle stop, the battery voltage $V_{bat}$ drops and becomes within the operable low battery voltage range (low VB) 518. In the low VB 518-range, the switching current 160A for boosting (namely, booster coil current 110A) may not reach the predetermined switching stop threshold value 410 within the switching cycle 500.

Figure 4:
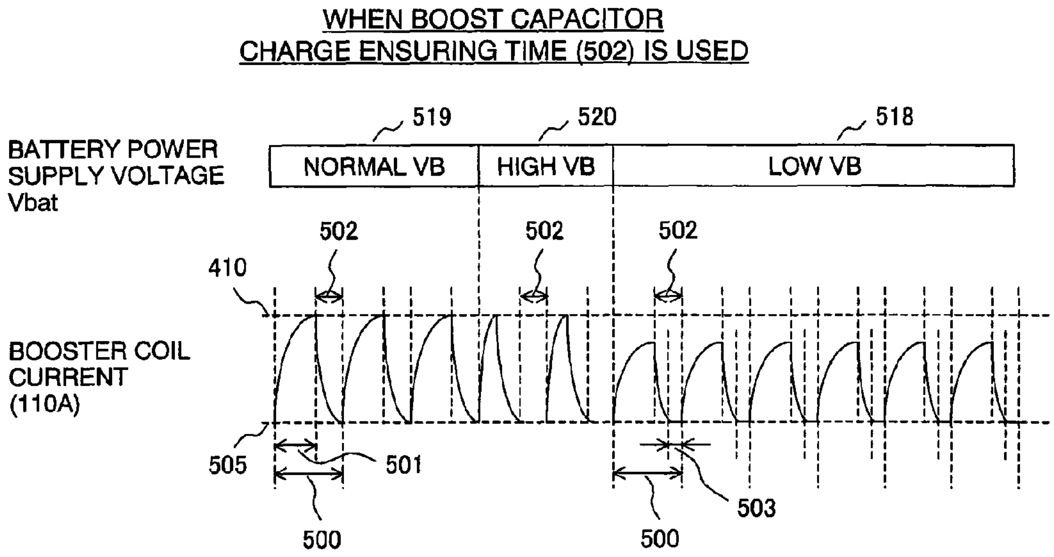
FIG. 4A is a drawing illustrating a current waveform of a booster coil current in the first embodiment of the invention for the comparison of the boost circuit operation of an internal combustion engine controller of the invention with that in a conventional example.
FIG. 4B is a drawing illustrating a current waveform of a booster coil current in the conventional example for the comparison of the boost circuit operation of an internal combustion engine controller of the invention with that in the conventional example.
Figure 4:
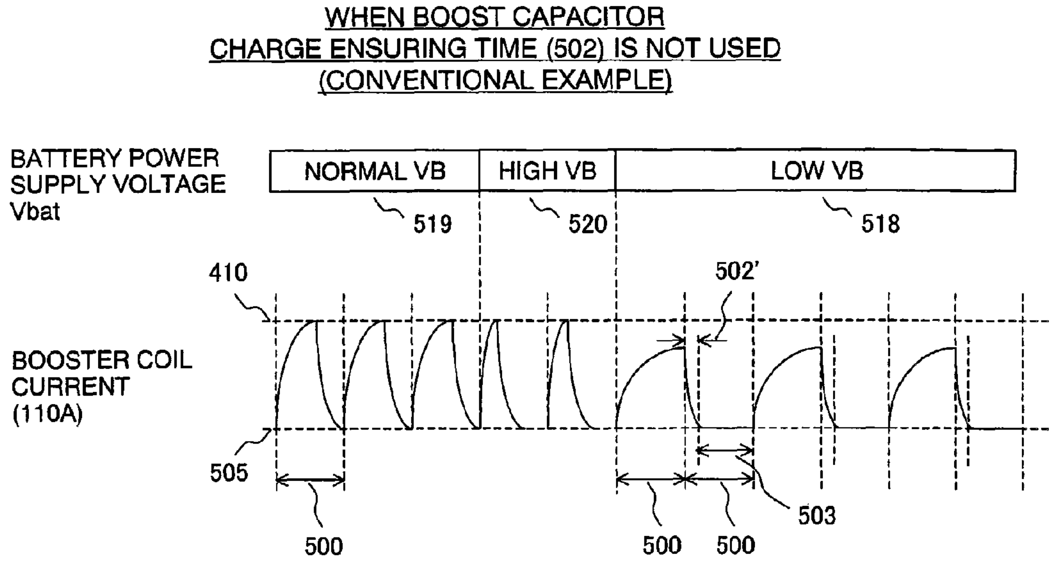

When the battery power supply voltage falls into the low VB 518 state in a conventional internal combustion engine controller, as illustrated in FIG. 4B, the period required for charging the energy from the booster coil 110 to the booster capacitor 130 is shifted to the next boost switching cycle 500. For this reason, a long boost operation stop time 503 occurs after the end of charging before the passage of current through the booster coil is started again. Therefore, the boost voltage recovery time 403 is lengthened more than by the influence of the battery voltage $V_{bat}$ drop.

In order to cope with such a problem, as illustrated in FIG. 4A, the internal combustion engine controller of this embodiment is configured to set the booster coil current rise time 501 for increasing the booster coil current 110 in the first half of the switching cycle 500 and set the booster capacitor charge-ensuring time 502 as the fixed time period in the second half of the boost switching cycle 500. Therefore, even when the booster coil current 110A does not rise up to the switching stop threshold value 410, it is possible to ensure the time period required for charging the energy from the booster coil 110 to the booster capacitor 130 by the booster coil charge-ensuring time 502 before the end of the boost switching cycle 500. As a result, the boost operation stop time 503 can be minimized.

Description will be given to a relation between the battery voltage $V_{bat}$ and the boost voltage recovery time 403 in the internal combustion engine controller in this embodiment with reference to FIG. 5. The description will be given based on the comparison with the relation in a conventional internal combustion engine controller.

Figure 5:
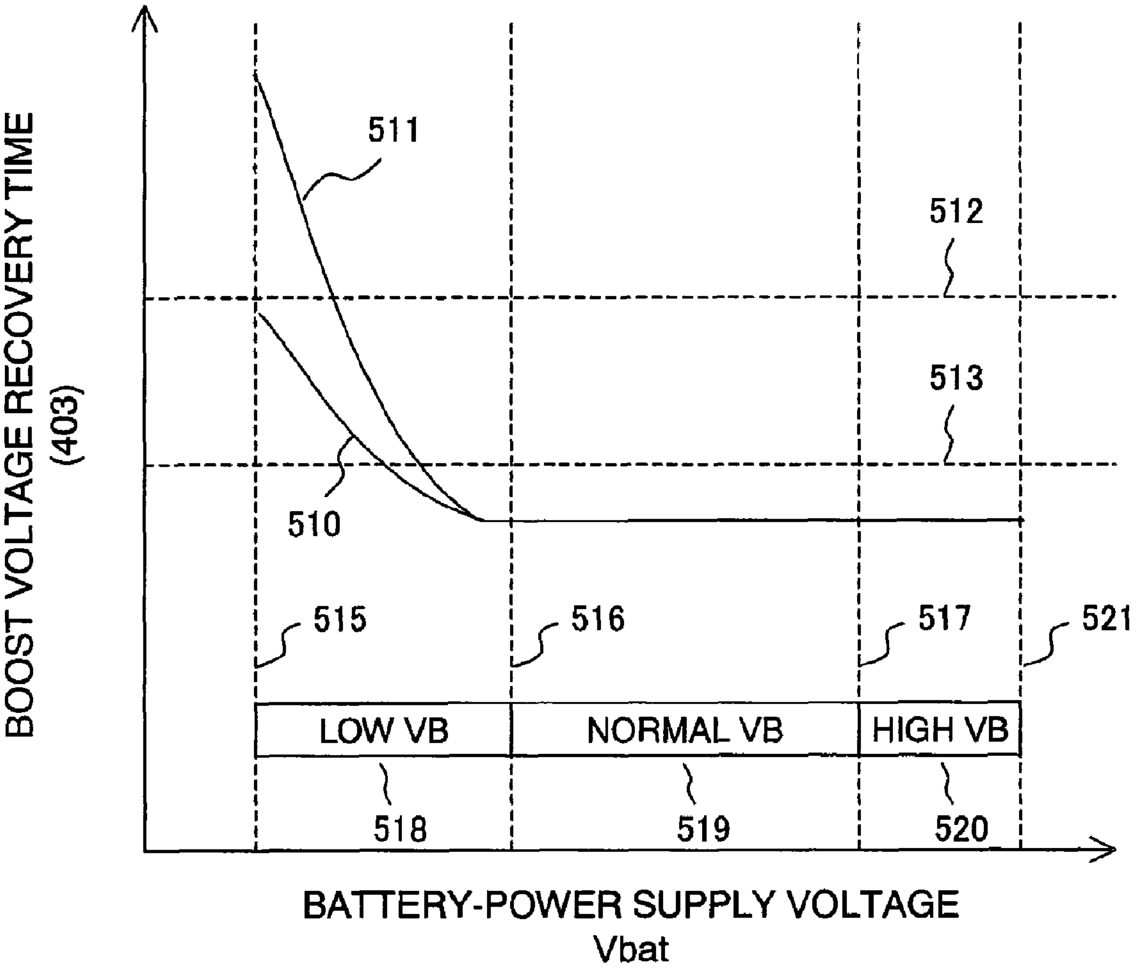
FIG. 5 is a graph illustrating a relation between a battery voltage and a boost voltage recovery time.

In FIG. 5, the boost voltage recovery time 403 refers to a time period required for the boost voltage 100A to be recovered to a voltage required for the drive circuit 2 to open an injector 3. Boost voltage recovery request time refers to a minimum boost voltage recovery time requested to the boost circuit and which is one to open an injector in a predetermined time (at predetermined intervals) by the drive circuit 2. Normal-voltage boost voltage recovery request time 513 is boost voltage recovery request time on condition that the battery power supply voltage is normal VB 519. Low-voltage boost voltage recovery request time 512 is boost voltage recovery request time on condition that the battery power supply voltage is low VB 518.

Both in the internal combustion engine controller of this embodiment and in the conventional internal combustion engine controller, on condition that the battery-power supply voltage $V_{bat}$ is within the ranges of normal VB 519 and high VB 520, even when the battery power supply voltage $V_{bat}$ fluctuates, the boost voltage recovery time 403 becomes constant in a shorter time than the normal-voltage boost voltage recovery request time 513.

However, when the battery voltage $V_{bat}$ falls within the range of low VB 518 lower than the characteristic guaranteed minimum battery power supply voltage 516, in the conventional internal combustion engine controller, the boost voltage recovery time 511 is rapidly lengthened as the battery-power supply voltage drops. Consequently, it may exceed the low-voltage boost voltage recovery request time 512.

In contrast to this, according to the internal combustion engine controller of this embodiment, it makes the boost voltage recovery time possible to satisfy the low-voltage boost voltage recovery request time 512 (Graph 510) even when the battery-power supply voltage $V_{bat}$ is within the range of low VB.

As described up to this point, according to the internal combustion engine controller of this embodiment, the following advantages is obtained by setting the booster coil current rise time 501 and the booster capacitor charge-ensuring time 502 in the predetermined switching cycle 500. That is, it is possible to minimize the lengthening of the boost voltage recovery time 403 of the boost circuit 100 without change to the basic circuitry of the boost circuit 100 even when the battery-power supply voltage $V_{bat}$ drops. Thereby, the controller can prevent the recovery time 403 from exceeding the low-voltage boost voltage recovery request time 512. More specific description will be given. Since the lengthening of the boost voltage recovery time 403 can be minimized when the battery-power supply voltage $V_{bat}$ drops, it can be unnecessary to wait for boost voltage recovery to let the injection interval of an injector significantly lengthen even when the battery-power supply voltage drops in the following cases: when the internal combustion engine is started by supplying a large current to a starter; when power generation by an alternator becomes insufficient; when the internal combustion engine is restarted after it is temporarily stopped by idle stop; and the like. Therefore, the internal combustion engine controller of this embodiment makes it possible not only to make an injector drivable to prevent the interruption of fuel injection as at the time of normal voltage even when the battery-power supply voltage $V_{bat}$ becomes low. The internal combustion engine controller of this embodiment makes it possible also to inject fuel more than once and prevent the degradation of exhaust at startup and the degradation in fuel economy.

Incidentally, at normal VB and high VB, it is desirable that the time period required for charging the energy generated by the booster coil 110 to the booster capacitor 130 is shortened as soon as possible in consideration of variation of various parts and fluctuation of temperature. Therefore, it is desirable that the cycle of the boosting energization timing signal 156A should be set variably in accordance with such situations, so that it is possible to obtain the boost voltage recovery time 403 determined by the minimum injector driving interval required for the internal combustion engine (injector 3). Further it is possible to prevent the passage of excessive switching current 160A for boosting (exceeding the switching stop threshold value 410) in consideration of the inductance of the booster coil 110 and the boost switching cycle 500. There are some possible methods to set the cycle of the boosting energization timing signal 156A to a target value. Examples of such methods include: a method of using a control circuit-to-control circuit signal communicated between an external control circuit (for example, the control circuit 300 in FIG. 7) and the booster control circuit; and a method of using component values of adjustment parts, not shown, installed in the boost circuit 100.

Additionally, according to the internal combustion engine controller of this embodiment, when the interruption of injector energization current 3A by the drive circuit 2 is started, the regenerative current from an injector 3 flows to the booster capacitor 130 through the current regenerating diode 2 during the step-down period 466 of the hold current (FIG. 3(*e*)). As a result, the energy stored in the inductance of the injector migrates to the booster capacitor 130 as in the above-mentioned boost operation. Therefore, the boost voltage 110A stored in the booster capacitor 130 is increased. Consequently, the energy stored in the booster capacitor 130 as the result of the current regeneration from the injector 3 is used as energy for assisting boost operation and this makes it possible to shorten the boost voltage recovery time 403.

Description will be given to a second preferred embodiment of the invention with reference to FIG. 6.

Figure 6:
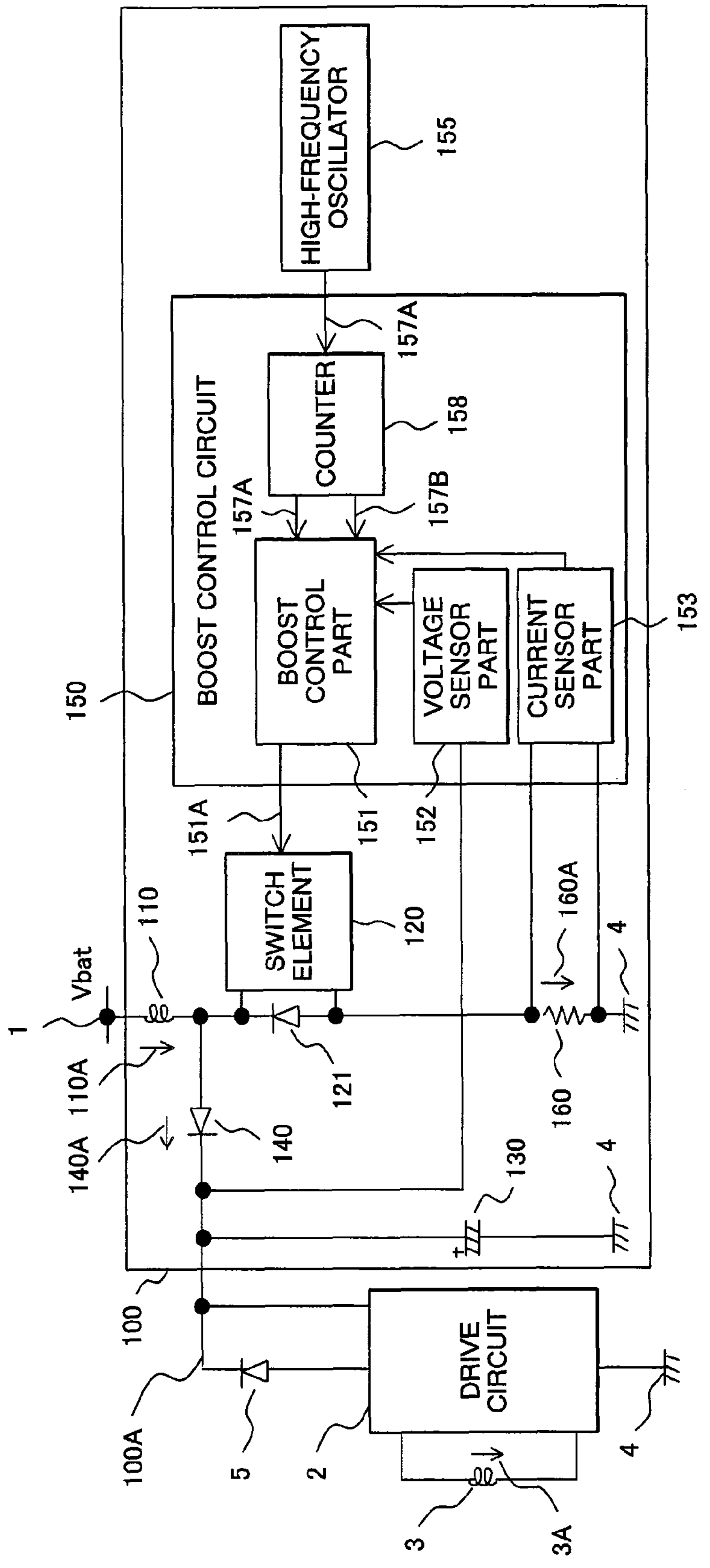
FIG. 6 is a circuit diagram illustrating an internal combustion engine controller in a second embodiment of the invention.

As illustrated in FIG. 6, the basic configuration of the internal combustion engine controller of this embodiment is substantially the same as that of the above-mentioned internal combustion engine controller illustrated in FIG. 1. The same component parts will be marked with the same reference numerals as in FIG. 1. The first embodiment has the two oscillators (low-frequency oscillator 154 and high-frequency oscillator 155) and the counter 156 as a mechanism for generating the basic clock signal 154A and the boosting energization timing signal 156A. The internal combustion engine controller of the second embodiment is different in that the low-frequency oscillator is omitted and there are provided one oscillator 157 and a counter 158.

In this embodiment, the boost control part 151 is connected with the counter 158 and the counter 158 is connected with the high-frequency oscillator 157. The high-frequency oscillator 157 generates a high-frequency clock signal 157A and sends this signal to the counter 158. The counter 158 generates a basic clock signal 158A and a boosting energization timing signal 158B from the high-frequency clock signal 157A and sends these signals to the boost control unit. Specifically, the counter 157 divides the frequency of the high-frequency clock signal 157A to generate the basic clock signal 158A and generates the boosting energization timing signal 158B from this basic clock signal 158A and the high-frequency clock signal 157A.

The internal combustion engine controller in this embodiment brings about the same action and effect as the internal combustion engine controller of the first embodiment does. Further, it makes it possible to make the circuitry thereof simpler than that of the internal combustion engine controller in the first embodiment.

Description will be given to a third preferred embodiment of the invention with reference to FIG. 7.

In the internal combustion engine controller of this embodiment, FET is used as the switch element 120 corresponding to that of FIG. 1. Additionally, a drive circuit 2 drives multiple injectors and a load (hereafter, referredto as "second load") other than the injectors. The boost circuit 150 and the drive circuit 200 are controlled by an external controller.

In general, a drive circuit for direct injector that uses boost voltage obtained by boosting battery voltage is configured to drive two or more injectors. In the case of four- to eight-cylinder engine, for example, used is one or two boost circuits and one boost circuit is shared among multiple drive circuits. The number of drive circuits per the boost circuit is determined by factors of energy required for driving during the peak current period of injector energization current 3A, maximum engine speed, boost voltage recovery time determined by the number of times of fuel injection per one cylinder from the injector for one cycle of combustion; self-heating of the boost circuit, and the like.

Figure 7:
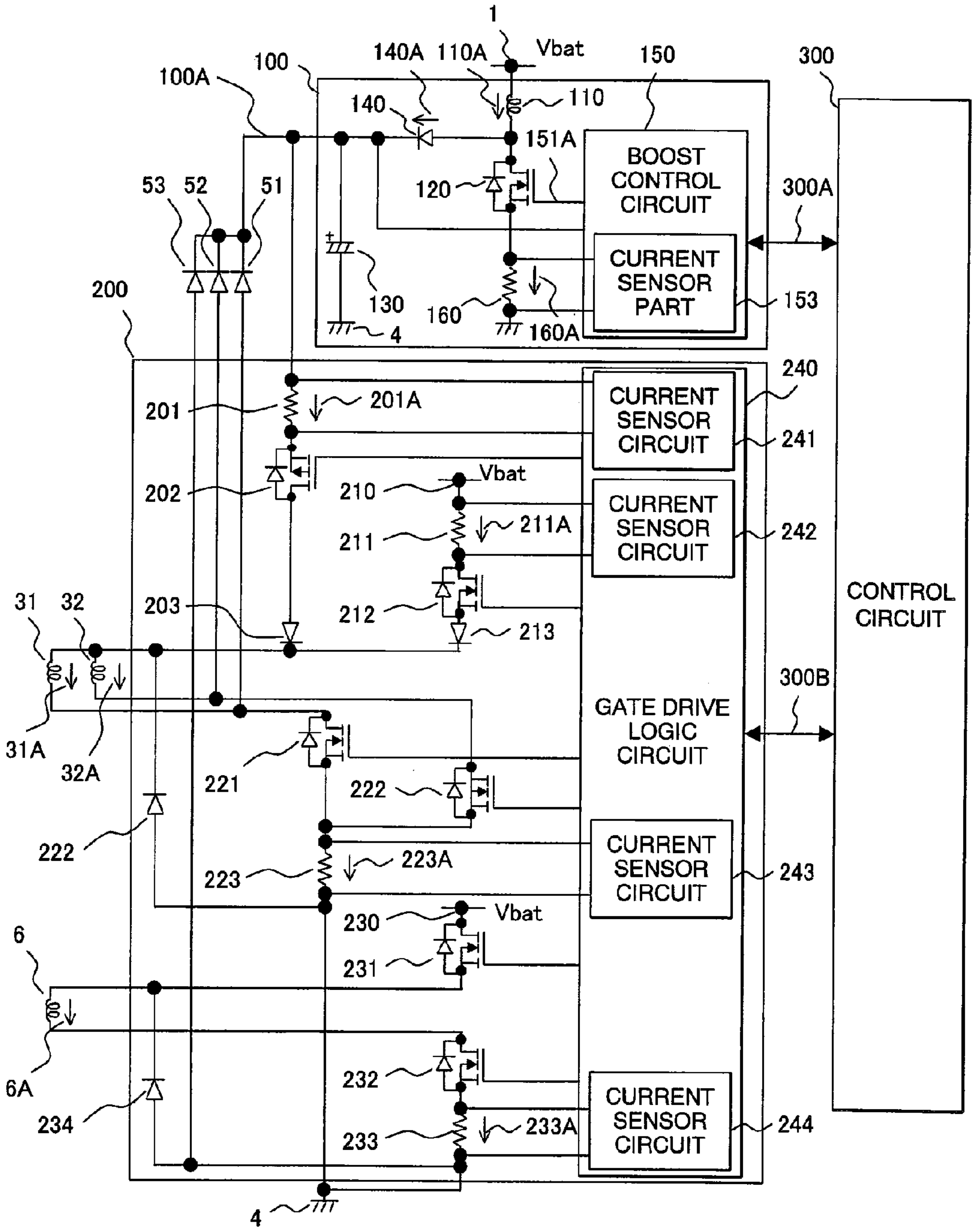
FIG. 7 is a circuit diagram illustrating an internal combustion engine controller in a third embodiment of the invention.
Figure 8:
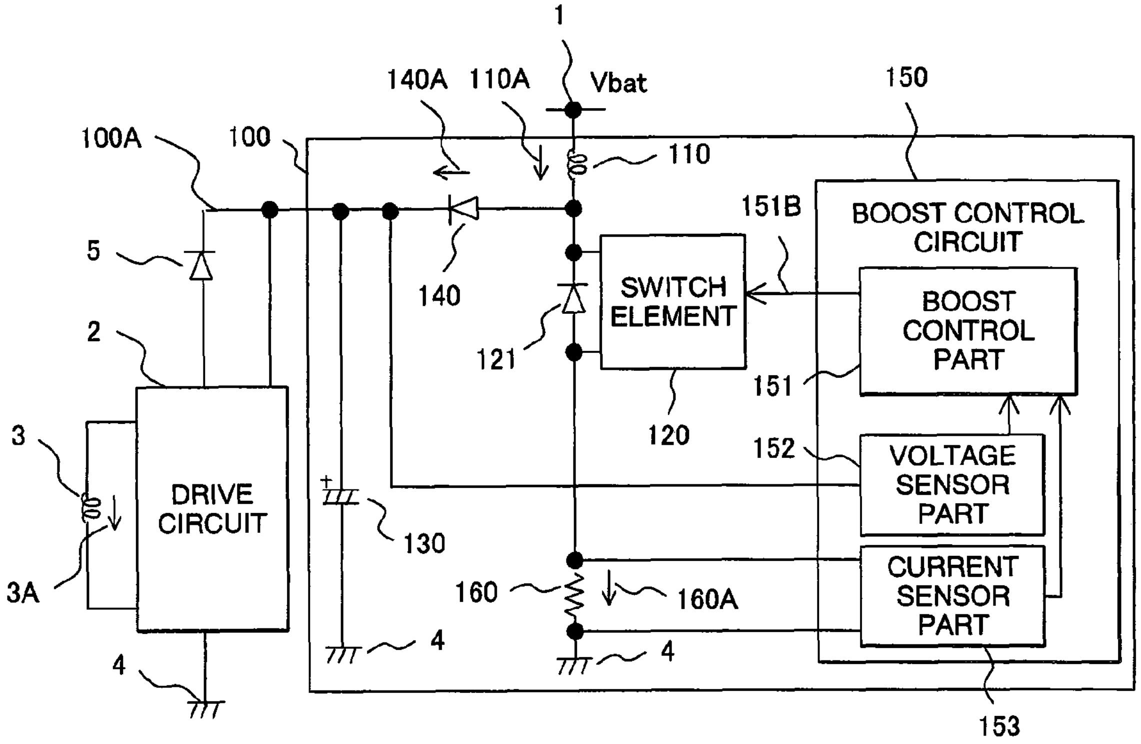
FIG. 8 is a circuit diagram illustrating a conventional internal combustion engine controller.

In the example of this embodiment illustrated in FIG. 7, the internal combustion engine controller has one boost circuit 100 and one drive circuit 200 and this drive circuit 200 drives two injectors 31, 32 and one second load 6. Typical concrete examples of the second load 6 include: solenoid for controlling a high-pressure pump that pressurizes fuel to high pressure and supplies this high-pressure fuel to a fuel pipe designated as common rail; and electrically controlled relief valve used to discharge fuel to the low pressure-side pipe to prevent damage to a fuel system when the fuel pressure in a common rail is abnormally increased by a high-pressure pump.

The internal combustion engine controller includes one control circuit 300 connected to the boost circuit 100 and the drive circuit 200 in common. The boost voltage 100A can be variably controlled from the external control circuit 300 by separating the control circuit 300 and the boost circuit 100 from each other and carrying out communication between them by a control circuit-to-boost circuit signal 300A. This system can be comfortably and safely used to carry out the following operation: the result of a self-diagnosis of the boost circuit 100 is sent to the control circuit 300; and the driving method is changed to a method that does not require boost voltage and the relevant car is driven to a repair shop. The boost circuit 100 may be configured so that it operates independently of the external controller 300 (the oscillator and the like are provided in the boost circuit) like the boost circuit 100 in FIG. 1 or FIG. 4.

Hereinafter, description will be given to the configuration of the drive circuit 200.

Between the boost circuit 100 side and the upstream side of the first and second injectors 31, 32, the following are sequentially connected: a boost-side current detection resistor 201 that converts boost-side driving current 201A into voltage for the detection of overcurrent of current flowing out of the boost circuit 100 or a harness break and the like on the injector 31, 32 side; a boost-side driving FET 202 for driving during the peak current period 463 (FIG. 3(*e*)) of injector energization current 3A; and a boost-side protective diode 203 for preventing reverse current when the boost circuit 100 goes out of order.

Between the battery power supply voltage 1 side and the upstream side of the injectors 31, 32, the following are sequentially connected: a battery-side current detection resistor 211, a battery-side driving FET 212, and a battery-side protective diode 213. The battery-side current detection resistor 211 is used to convert battery-side driving current 211A into voltage for the detection of overcurrent from the batteryl or a harness break and the like on the injector 31, 32 side. The battery-side driving FET 212 is used to drive the first hold current 461-1, 461-2 and the second hold current 462 of injector energization current 3A indicated by FIG. 3 (*e*). The battery-side protective diode 213 is used to prevent backflow from the boost voltage 100A to the battery 1.

The downstream side of the first injector (electromagnetic coil) 31 is connected with a first downstream-side driving FET 221 and the downstream side of the second injector (electromagnetic coil) 32 is connected with a second downstream-side driving FET 222. The first downstream-side driving FET 221 or the second downstream-side driving FET 222 is used to select an injector 31, 32 to be energized by switching operation. The first downstream-side driving FET 221 and the second downstream-side driving FET 222 are connected downstream thereof and are connected to power supply ground 4 through a downstream-side current detection resistor 223 for converting current into voltage.

A feedback diode 224 is connected so that the direction from the power supply ground 4 to the upstream side of the injectors 31, 32 is the forward direction to feed back the regenerative current of the injector 31 (or 32). This regenerative current is produced when the boost-side driving FET 202 and the battery-side driving FET 212 are simultaneously interrupted and either the downstream-side driving FET 221 or the downstream-side driving FET 222 is selected and energized.

Further, current regenerating diodes 51, 52 are respectively connected so that the direction from the downstream side of the injectors 31, 32 to the boost circuit 100 is the forward direction. The current regenerating diodes 51, 52 are used to regenerate the electrical energy of the injectors 31, 32 to the boost circuit 100 by performing the following operation: while injector energization currents 31A, 32A are passed, the boost-side driving FET 202, battery-side driving FET 212, downstream-side driving FET 221, and downstream-side driving FET 222 are all interrupted.

The upstream side of the second load 6 is connected to the battery 1 through a load upstream-side driving FET 231. The downstream side of the second load is connected to the power supply ground 4 through a load downstream-side driving FET 232 and a downstream-side current detection resistor 233 for converting downstream-side driving current 233A into voltage, connected in this order.

A feedback diode 234 is connected so that the direction from the power supply ground 4 to the upstream side of the second load 6 is the forward direction for feeding back the regenerative current of the second load 6. This regenerative current is produced when the load upstream-side driving FET 231 is turned on and the load downstream-side driving FET 232 is turned off while second load current 6A is passed. A current regenerating diode 53 is connected so that the direction from the downstream side of the second load device 6 to the boost voltage 100A is the forward direction for regenerating electrical energy produced in the second load 6 to the boost circuit 100. The electrical energy is produced when the load upstream-side driving FET 231 and the load downstream-side driving FET 232 are interrupted while the second load current 6A is passed.

The regenerative current of the second load 6 can be fed back to the boost circuit 100 through the current regenerating diode 53 like the regenerative currents of the first and second injectors 31, 32. The load downstream-side driving FET 232 is used to make the following selection with respect to the regenerative current of the second load current 6A: whether to feed back the current to the boost circuit 100 through the current regenerating diode 53 to step it down in a short time or step it down through the feedback diode 234 in a longer time. The load upstream-side driving FET 231 is used to control the second load current 6A to the hold current by applying battery-power supply voltage $V_{bat}$ to the second load 6.

The respective gates of the boost-side driving FET 202, battery-side driving FET 212, first downstream-side driving FET 221, second downstream-side driving FET 222, load upstream-side driving FET 231, and load downstream-side FET 232 are connected to a gate drive logic circuit 240. The gate drive logic circuit 240 includes: a boost-side current detection circuit 241 that detects boost-side driving current 201A by the boost-side current sensing resistor 201; a battery-side current detection circuit 242 that detects battery-side driving current 211A by the battery-side current sensing resistor 211; a downstream-side current detection circuit 243 that detects downstream-side driving current 223A by the downstream-side current sensing resistor 223; and a downstream-side current detection circuit 244 for the second load that detects the downstream-side current 233A of the second load by the second load-side current sensing resistor 233. The gate drive logic circuit 240 is connected to the control circuit 300 external to the drive circuit. The gate drive logic circuit is inputted with a control circuit-to-control circuit signal (energization timing signal) 300B from the control circuit 300 based on the number of engine revolutions and conditions for input from various sensors. When the control circuit-to-control circuit signal 300B is inputted, the gate drive logic circuit 240 performs the following operation: it generates driving signals based on the control circuit-to-control circuit signal 300B and the detection values of the currents 201A, 211A, 223A, 233A detected at the respective current detection circuits 241 to 244 to drive the respective FETs 202, 212, 221, 222, 231, 232.

The internal combustion engine controller of this embodiment brings about the same action and effect as the internal combustion engine controller of the first embodiment does.

The invention is not limited to the above-mentioned embodiments and can be variously embodied. For example, the invention is applicable not only to cylinder injection direct injectors that use a solenoid as a power source and electrically have an inductance. The invention is applicable also to a system in which an object that uses a piezo element as a power source and electrically has a capacitor is driven and high voltage that has dropped due to them is supplemented by the switching operation of a boost circuit.

What is claimed is:

1. An internal combustion engine controller comprising:

a booster coil connected to a battery to boost a voltage of the battery;

a switch element connected to the booster coil to control the passage of current through the booster coil and an interruption of the current;

a booster capacitor for accumulating electrical energy generated with an inductance of the booster coil at the time of the interruption of the passage of the current; and a booster control circuit for carrying out control in a constant boost switching cycle so as to pass the current through the booster coil and the switch element and then interrupt the current to charge the energy generated with the inductance of the booster coil into the booster capacitor;

wherein the booster control circuit is configured to set a booster capacitor charge-ensuring time as a fixed time period in a second half of the boost switching cycle to ensure at least minimum time period for the booster capacitor-charging of the energy within the boost switching cycle, and to interrupt the current and charge the energy generated with the inductance of the booster coil into the booster capacitor whenever one of the following is satisfied i) the current reaches a preset switching stop threshold value; and ii) said booster capacitor charge-ensuring time has been reached.

2. The internal combustion engine controller according to claim 1, wherein the booster control circuit is configured to generate a boosting basic clock signal having a certain cycle and a boosting energization timing signal different from the boosting basic clock signal, and to set the boost switching cycle and the minimum time period for the booster capacitor-charging based on the two signals.

3. The internal combustion engine controller according to claim 2, wherein the boosting energization timing signal is generated based on the boosting basic clock signal and a high-frequency clock signal having a higher frequency than the frequency of the boosting basic clock signal.

4. The internal combustion engine controller according to claim 3, wherein the boosting basic clock signal is a clock signal obtained by dividing the frequency of the high-frequency clock signal.

5. The internal combustion engine controller according to claim 1, wherein the minimum time period for the booster capacitor-charging is set as a fixed time period or variably set based on an externally inputted control signal.

6. The internal combustion engine controller according to claim 1, wherein the switch element is constructed of a field effect transistor or a bipolar transistor.

* * * * *